United States Patent [19]

Ueda

[11] Patent Number: 4,585,185
[45] Date of Patent: Apr. 29, 1986

[54] RETRACTOR

[75] Inventor: Takeo Ueda, Fujisawa, Japan

[73] Assignee: NSK-Warner K.K., Tokyo, Japan

[21] Appl. No.: 556,349

[22] Filed: Nov. 30, 1983

[30] Foreign Application Priority Data

Dec. 8, 1982 [JP] Japan .......................... 57-184764[U]

[51] Int. Cl.[4] ............................................ B65H 75/48
[52] U.S. Cl. ............................. 242/107; 242/107.4 A
[58] Field of Search .......... 242/107, 107.4 A, 107.4 R

[56] References Cited

U.S. PATENT DOCUMENTS

| 3,942,739 | 3/1976 | Torphammar | 242/107.4 A |
| 4,081,152 | 3/1978 | Henderson | 242/107.4 R X |
| 4,083,512 | 4/1978 | Rumpf | 242/107.4 B X |
| 4,382,563 | 5/1983 | Morita et al. | 242/107 |

Primary Examiner—Stuart S. Levy
Assistant Examiner—Katherine Matecki
Attorney, Agent, or Firm—Shapiro and Shapiro

[57] ABSTRACT

A retractor has a webbing take-up shaft rotatably supported in a base, a biasing member for biasing the take-up shaft in a webbing take-up direction, a connecting member for connecting one portion and another portion of the biasing member, a locking member movably provided in the base and engageable with the connecting member, and a control device for controlling the condition of the locking member. The locking member is capable of assuming a locking position in which it is engaged with the connecting member to prevent the biasing force of the other portion of the biasing member from acting on the take-up shaft and a non-locking position in which it is in non-engagement with the connecting member to permit the biasing force of the one portion and the other portion of the biasing member to act on the take-up shaft, and when the locking member is brought to the locking position by the control device, it is movable away from the connecting member when the connecting member moves with the take-up shaft rotating in a webbing draw-out direction.

8 Claims, 4 Drawing Figures

RETRACTOR

BACKGROUND OF THE INVENTION

1. Field of the Invention

This invention relates to a retractor in which when the seat occupant wears webbing, the force in a take-up direction applied to the webbing is reduced so that any excessive pressure force is not applied to the wearer.

2. Description of the Prior Art

Generally, in a retractor, a biasing force of considerable strength in a take-up direction is applied to a webbing take-up shaft in the retractor in order to cause webbing drawn out for wearing to be taken up on the take-up shaft after its use. Therefore, even when the webbing is worn by the seat occupant, a strong biasing force in the take-up direction is applied to the webbing to thereby apply a considerable pressure force to the wearer, and this gives the wearer an uncomfortable feeling which forms a cause for the seat occupant to be unwilling to wear the seat belt in spite of the fact that wearing the seat belt is desirable in ensuring the safety of the seat occupant.

To solve this problem, it has been proposed to provide the retractor with a take-up force reducing device which negates a part of webbing biasing means so as not to act on the take-up shaft when the seat occupant wears the webbing and which causes that part of the webbing biasing means to be again effective when the webbing is to be taken up on the retractor. In this method, however, when one tries to draw out the webbing during the wearing of the webbing during which the reducing device is operating, the reducing device acts as a resistance against the draw-out of the webbing, and this considerably hampers free movement of the seat occupant when he wears the webbing.

SUMMARY OF THE INVENTION

It is an object of the present invention to solve the above-noted problem and to provide a retractor designed such that when the webbing is drawn out while the reducing device is operating, the reducing device can retract into a condition in which it permits smooth draw-out of the webbing.

The invention will become fully apparent from the following detailed description of an embodiment thereof taken in conjunction with the accompanying drawings.

DESCRIPTION OF THE PREFERRED EMBODIMENT

Figure 1:
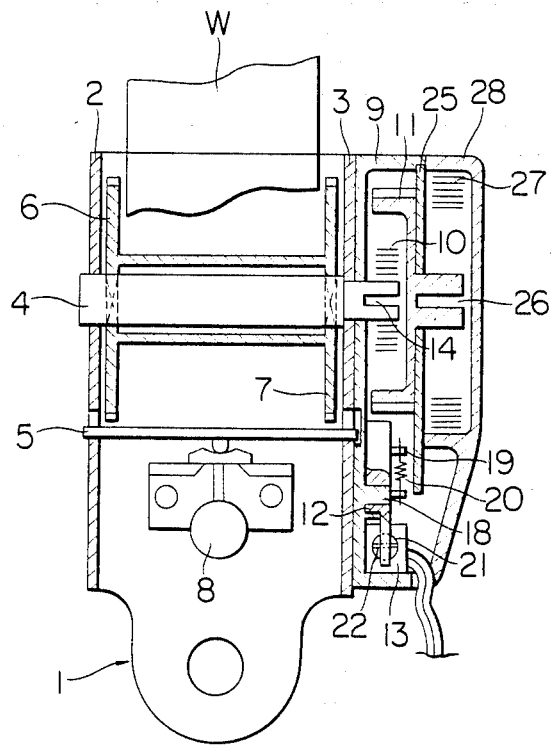
FIG. 1 is a front cross-sectional view of an embodiment of the present invention.
Figure 2:
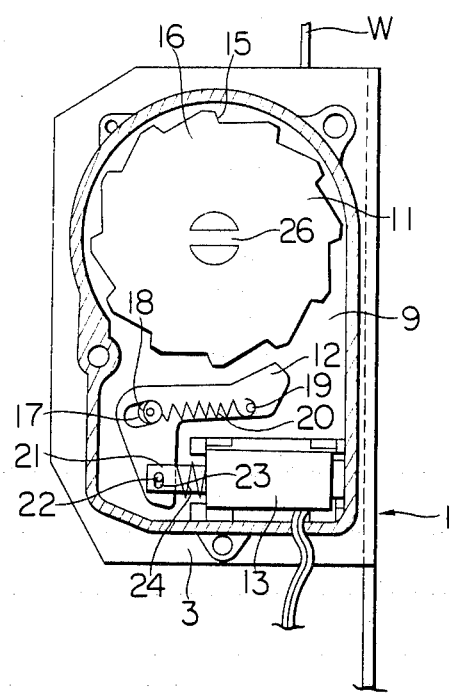
FIGS. 2 to 4 are side views, partly in cross-section, illustrating the operation of this embodiment.

Referring to FIGS. 1 and 2, a take-up shaft 4 is rotatably supported between opposite side plate portions 2 and 3 of a base member 1. A brake 5 is further tiltably supported between the side plate portions 2 and 3 and, when this brake meshes with a pair of latch plates 6 and 7 which are integral with the take-up shaft 4, rotation of the take-up shaft 4 in a webbing draw-out direction may be locked. The brake 5 is brought down in a direction to mesh with the latch plates 6 and 7 when a pendulum 8 swings on sensing a speed change of the vehicle or the like.

A mount 9 is secured to the side plate portion 3, and provided on the mount 9 are an auxiliary take-up spring 10 having a relatively weak spring force, a ratchet wheel 11 as a connecting member, a locking arm 12 as a locking member, and a solenoid 13 for controlling the locking arm 12. The inner end of the auxiliary take-up spring 10 is secured to the slit 14 of the take-up shaft 4 and the outer end of the auxiliary take-up spring is secured to the inner wall of the ratchet wheel 11. The ratchet wheel 11 is of a cup shape and contains the spring 10 therein, and the outer peripheral surface thereof is formed with a plurality of teeth 16 having engaging surfaces 15 facing in a webbing take-up direction. The locking arm 12 is formed with an arcuate slot 17 in which is received a strut 18 formed integrally with the mount 9. The locking arm 12 is further formed with a projection 19, and a tension spring 20 is extended between the projection 19 and the upper portion of the strut 18 and biases the locking arm 12 so that the strut 18 is urged toward the right end of the slot 17 as viewed in FIG. 2.

A plunger 21 protrudes from the solenoid 13 and is coupled to one end of the locking arm 12 through a pin 22. The point of coupling lies substantially at the center of the aforementioned arcuate slot 17. Since the pin 22 extends more or less loosely through a small slot 23 in the locking arm 12, the plunger 21 which moves rectilinearly and the locking arm 12 which swings are coupled together without any hindrance. When the solenoid 13 is energized, the plunger 21 is attracted to bring the locking arm 12 to a locking position in which it is engageable with a tooth 16 of the ratchet wheel 11, and when the solenoid 13 is deenergized, the plunger 21 is forced out by the action of a compression spring 24 to bring the locking arm 12 to a non-locking position in which it is not engageable with a tooth 16 of the ratchet wheel 11.

A partition plate 25 is provided at the outer side of the ratchet wheel 11, and a main take-up spring 27 having its inner end secured to a slit 26 in the shaft portion of the ratchet wheel 11 and having a relatively strong spring force is provided on the partition plate 25. The outer end of the main take-up spring 27 is secured to the inner wall of a spring case 28 which in turn is secured to the mount 9.

As described above, the spring force of the main take-up spring 27 is greater than that of the auxiliary take-up spring 10 which constitutes biasing means for the take-up shaft 4 together with the main take-up spring 27. Therefore, when the main take-up spring 27 is wound to some extent, in the first place the auxiliary take-up spring 10 of weak spring force is completely wound about the end of the take-up shaft 4 through the ratchet wheel 11 and afterward the main take-up spring 27 is gradually wound. Accordingly, when the springs 10, 27 are to be assembled with the main take-up spring 27 being previously wound, as shown in FIG. 1, the auxiliary take-up spring 10 is completely wound and the main take-up spring 27 is in such state wherein this spring 27 is previously wound to a little extent.

Operation of the present embodiment will now be described on the basis of the above-described construction.

When the webbing W is being drawn out or when a buckle, not shown, has been disengaged to remove the webbing which has so far been worn by the seat occupant, the solenoid 13 is in its deenergized condition and the plunger 21 is in its forced-out position and along therewith, the locking arm 12 is in its non-locking position of FIG. 2 wherein it has been turned rightwardly about the strut 18. In this condition, the biasing force of the main take-up spring 27 in the take-up direction is applied to the take-up shaft 4. Accordingly, if the force for drawing out the webbing W is eliminated in the draw-out process or if the buckle is disengaged and released, the whole amount of the webbing will be taken up around the take-up shaft 4 because a take-up force of sufficient magnitude is acting on the webbing.

Figure 3:
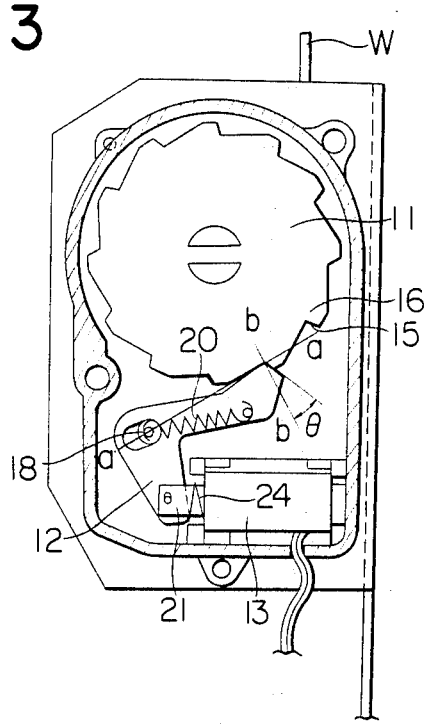

When a suitable amount of the webbing W is drawn out and the buckle is brought into its engaged condition to thereby permit the seat occupant to wear the webbing, the solenoid 13 is energized and the plunger 21 is attracted and along therewith, the locking arm 12 is turned leftwardly about the strut 18 to assume the locking position of FIG. 3 in which it is engageable with a tooth 16 of the ratchet wheel 11. When the locking arm 12 is turned leftwardly from the position of FIG. 2 to the position of FIG. 3, the strut 18 is maintained in contact with the right end of the slot 17 in the locking arm 12 by the force of the spring 20. In the position of FIG. 3, the ratchet wheel 11 is prevented from rotating in the take-up direction with the take-up shaft 4 by the locking arm 12 and therefore, the biasing force of the main take-up spring 27 having a strong spring force does not act on the take-up shaft 4, but the biasing force of the auxiliary take-up spring 10 having a weak spring force only acts on the take-up shaft 4. Accordingly, no great take-up force is applied to the webbing W and there will not occur a state in which the wearer of the webbing is heavily pressed and given a sense of displeasure.

Each tooth 16 of the ratchet wheel 11, as shown in FIG. 3, is provided with an angle of relief $\theta$ (an angle formed by the engaging surface 15 with a straight line b—b extending through the bottom of the tooth engaged with the locking arm 12 and being normal to a straight line a—a extending through the above the bottom of the tooth and a center of the strut 18) and therefore, when a force which tries to rotate the ratchet wheel 11 in the take-up direction with the take-up shaft 4 acts on the ratchet wheel 11, a force which tries to retract the locking arm 12 from its locking position acts on the locking arm 12, but the locking arm 12 continues to be held in the position of FIG. 3 because the plunger 21 is attracted deeply into the solenoid 13 with a sufficiently great force. In this manner, reduction of the take-up force is ensured when the seat occupant wears the webbing.

When the solenoid 13 is deenergized, the locking arm 12 is reliable and quickly brought to its non-locking position of FIG. 2 even if more or less friction force is acting between the engaging surface 15 and the locking arm 12, because each tooth 16 is provided with the angle of relief $\theta$ as described above and the compression spring 24 is provided. Thus, the spring force of the auxiliary spring 10 acts on the take-up shaft 4 until the auxiliary spring 10 is completely wound, and after the auxiliary spring 10 has been completely wound, the spring force of the main take-up spring 27 again acts on the take-up shaft 4 and the webbing W is about to be taken up with a strong force.

Figure 4:
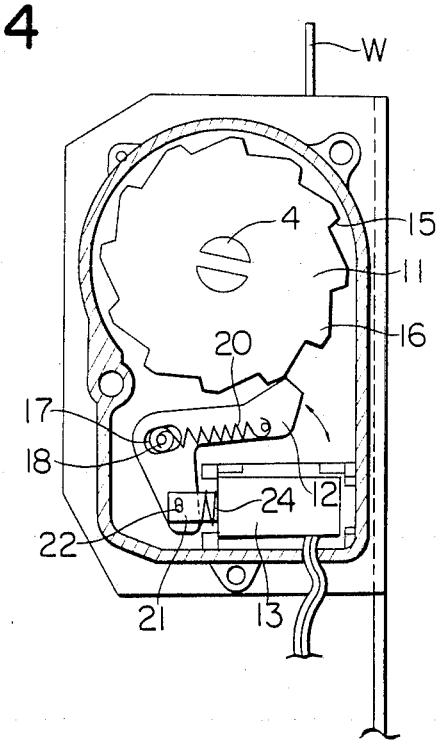

On the other hand, if one tries to draw out the webbing W in the condition of FIG. 3, the ratchet wheel 11 tries to rotate in the draw-out direction with the take-up shaft 4 and thus tries to retract the locking arm 12 from its locking position by the bottom of a tooth 16. At this time, the point of coupling between the plunger 21 and the locking arm 12, namely, the pin 22, is not moved because the plunger 21 is strongly attracted and remains immovable. Accordingly, the locking arm 12 begins to turn rightwardly substantially about the pin 22 which is an immovable point against the force of the tension spring 20. At this time, the strut 18 becomes disengaged from the right end of the arcuate slot 17 and relatively moves leftwardly in this slot 17. Also, the force of the tension spring 20 always acts on the locking arm 12 and therefore, as the ratchet wheel 11 is turned leftwardly, the locking arm 12 repeats reciprocal swinging movement as indicated by the double-headed arrow in FIG. 4 while always keeping contact with the surface which defines the teeth 16. Thus, when the seat occupant wears the webbing, the locking arm 12 in its locking position retracts in a direction in which it does not hamper the draw-out of the webbing, so that the webbing W can be smoothly drawn out without being subjected to any excessive resistance from the take-up force reducing device. In this manner, when the seat occupant wears the webbing, the take-up force is reduced and the webbing can be smoothly drawn out so as to permit free movement of the wearer.

Now, in the above-described embodiment, the solenoid may be designed such that it is energized in response, for example, to the closing of the door or the seating of the seat occupant.

According to the present invention, as described above, the design is such that the locking arm which is a locking member can assume the non-locking position and the locking position, and in the locking position, can also assume the retracted position and therefore, the intended purpose of the invention can be achieved without increasing the number of parts or complicating the configurations of the parts. This leads to the realization of a retractor with a take-up force reducing device which is simple in construction and much less liable to cause troubles, and moreover is easily assembled, and which permits smooth draw-out of the webbing when it is worn by the seat occupant.

I claim:
1. A retractor provided with a take-up force reducing device, comprising:
 a base;
 a webbing take-up shaft rotatably supported in said base;
 biasing means for biasing said take-up shaft in a webbing take-up direction, said biasing means including first and second portions;
 a connecting member for connecting said first and second portions of said biasing means, said connecting member being connected to said take-up shaft through said first portion and being connected to said base through said second portion;
 a single-piece, rigid locking member, the entire locking member being selectively pivotable about a first axis means fixed to said base and selectively pivotable about a second axis means and having an engaging portion;
 control means for controlling said locking member, said control means being pivotally coupled to said locking member through said second axis means so that said control means rotates the entire locking member about said first axis means, by moving said second axis means, between a locking position in which said engaging portion is engaged with said connecting member to prevent said connecting member from rotating in the take-up direction together with said take-up shaft, so as to prevent the biasing force of said second portion of said biasing means from acting on said take-up shaft, and a non-locking position in which said engaging portion is disengaged from said connecting member to allow the rotation of said connecting member together with said take-up shaft, so as to permit the biasing forces of both of said first and second portions of said biasing means to act on said take-up shaft;

first means for allowing the entire locking member to rotate about said second axis means in such a direction that said engaging portion may move toward a disengaging condition, in which said engaging portion is disengaged from said connecting member, to allow the rotation of said connecting member together with said take-up shaft in a webbing draw-out direction even when the locking member is in said locking position; and second means for causing the entire locking member to rotate about said first axis means between said locking position and said non-locking position when said second axis means is moved by said control means.

2. A retractor according to claim 1, wherein said locking member is biased toward said non-locking position.

3. A retractor according to claim 1, wherein said first means comprises an arcuate slot which is formed in said locking member and in which said first axis means is received, and wherein the center of curvature of said arcuate slot lies substantially at said second axis means.

4. A retractor according to claim 3, wherein said second means comprises a spring member interposed between said locking member and said first axis means and said first axis means is maintained in contact with a portion of said locking member defining one end of said arcuate slot by the force of said spring member so as to rotate said locking member about said first axis means when said second axis means is moved by said control means.

5. A retractor according to claim 1, wherein said control means comprises a solenoid and a plunger, said second axis means comprises a pin mounted on said plunger, and said locking member is formed with an opening in which said pin is received.

6. A retractor according to claim 1, wherein said connecting member is a ratchet wheel, an outer peripheral surface of said ratchet wheel being formed with plural teeth each of which has an engaging surface facing in the webbing take-up direction for engaging with said engaging portion of said locking member.

7. A retractor according to claim 6, wherein said engaging surface of each of said teeth is so oriented that said locking member rotates smoothly about said first axis means toward said non-locking position.

8. A retractor according to claim 1, wherein said first axis means comprises a strut formed integrally with a mount which is secured to said base.

* * * * *